(12) United States Patent
Saito

(10) Patent No.: US 11,608,077 B2
(45) Date of Patent: *Mar. 21, 2023

(54) COLLISION VISUALIZATION DEVICE FOR VISUALIZING DRIVING STATE OF VEHICLE AND RECORDING MEDIUM

(71) Applicant: CREO CO., LTD., Sagamihara (JP)

(72) Inventor: Eisuke Saito, Sagamihara (JP)

(73) Assignee: CREO CO., LTD.

(*) Notice: Subject to any disclaimer, the term of this patent is extended or adjusted under 35 U.S.C. 154(b) by 78 days.

This patent is subject to a terminal disclaimer.

(21) Appl. No.: 17/231,294

(22) Filed: Apr. 15, 2021

(65) Prior Publication Data

US 2021/0229694 A1 Jul. 29, 2021

Related U.S. Application Data

(63) Continuation of application No. 17/032,574, filed on Sep. 25, 2020, now Pat. No. 11,040,728, which is a
(Continued)

(51) Int. Cl.
*B60Q 1/00* (2006.01)
*B60W 50/14* (2020.01)
*B60W 30/095* (2012.01)

(52) U.S. Cl.
CPC ........ *B60W 50/14* (2013.01); *B60W 30/0953* (2013.01); *B60W 2050/146* (2013.01); *B60W 2554/80* (2020.02)

(58) Field of Classification Search
CPC ............ B60R 21/00; B60W 2050/146; B60W 2554/80; B60W 30/0953; B60W 50/14; G07C 5/00; G08G 1/00
(Continued)

(56) References Cited

U.S. PATENT DOCUMENTS 4,772,868 A * 9/1988 Chen .................. B60Q 1/44
340/467
5,979,328 A * 11/1999 Rodrigues ............... B60Q 1/52
102/342
(Continued)

FOREIGN PATENT DOCUMENTS

CN 101847272 A 9/2010
CN 102481885 A 5/2012
(Continued)

OTHER PUBLICATIONS

First Office Action for corresponding Chinese Application No. 201880091178.8 dated Feb. 24, 2022 with English translation (26 Pages).
(Continued)

*Primary Examiner* — Naomi J Small
(74) *Attorney, Agent, or Firm* — Harness, Dickey & Pierce, P.L.C.

(57) ABSTRACT

A collision visualization device includes an identification unit analyzing vehicle traveling information in which information representing at least a type and occurrence time of an event generated in a vehicle to be analyzed in a time period including occurrence time of a collision or each of a series of collisions occurring for the vehicle, is recorded in accordance with occurrence order, and identifying a state of the vehicle in the time period, and a visualization unit causing a display device to display an iconic image representing the state of the vehicle identified by the identification unit.

14 Claims, 17 Drawing Sheets

Related U.S. Application Data continuation of application No. PCT/JP2018/012820, filed on Mar. 28, 2018.

(58) Field of Classification Search
USPC .......................................................... 340/435
See application file for complete search history.

(56) References Cited

U.S. PATENT DOCUMENTS

| | | | |
|---|---|---|---|
| 6,630,884 B1 * | 10/2003 | Shanmugham | G07C 5/0891 340/436 |
| 6,704,434 B1 | 3/2004 | Sakoh et al. | |
| 10,872,379 B1 * | 12/2020 | Nepomuceno | G08G 1/096775 |
| 2010/0023208 A1 | 1/2010 | Fukushima et al. | |
| 2013/0332026 A1 * | 12/2013 | McKown | B60R 21/013 701/33.7 |
| 2014/0253308 A1 * | 9/2014 | Kanda | G08G 1/205 340/436 |
| 2016/0132257 A1 * | 5/2016 | Chahwan | G07C 5/085 711/102 |
| 2017/0292848 A1 * | 10/2017 | Nepomuceno | G01C 21/3492 |
| 2018/0184051 A1 * | 6/2018 | Watanabe | G08B 25/08 |

FOREIGN PATENT DOCUMENTS

| | | |
|---|---|---|
| CN | 103065375 A | 4/2013 |
| CN | 103608207 A | 2/2014 |
| CN | 105378813 A | 3/2016 |
| CN | 106458031 A | 2/2017 |
| CN | 106627570 A | 5/2017 |
| CN | 107848541 A | 3/2018 |
| JP | 2000-211557 A | 8/2000 |
| JP | 2010-49681 A | 3/2010 |
| JP | 2014-2665 A | 1/2014 |
| JP | 2017-5649 A | 1/2017 |
| JP | 2017-10191 A | 1/2017 |
| JP | 6058907 B2 | 1/2017 |
| JP | 6142338 B2 | 6/2017 |
| JP | 6171142 B2 | 8/2017 |

OTHER PUBLICATIONS

Le Jian-wei et al., "Simulation of Multi-Function Displays in Virtual Cockpit", Journal of Sytem Simulation, Advanced Simulation Tecnology Key Lab, Beijing, Dec. 2005, vol. 17, No. 12, pp. 3046-3049. (and English Abstract).

Liu Yanxing, "Digital Logic Foundation", China Railway Publishing House, Jul. 2004, p. 216. (Statement of Relevancy is that it was cited in the First Office Action for counterpart Chinese Application No. 201880091178.8—copy and English translation enclosed).

Wu Maogang et al., "Delphi Program Basic Tutorial", Beijing Institute of Technology Press, Aug. 2007, p. 160. (Statement of Relevancy is that it was cited in the First Office Action for counterpart Chinese Application No. 201880091178.8—copy and English translation enclosed).

Xue Yu-bing et al., "Review on the research of the vehicle driving safety assistant system", Communications Science and Technology Heilongjiang (No. 2 (Sum No. 264)), 2016, pp. 124-126, DOI: 10.16402/j.cnki.issn1008-3383.2016.02.061.(and English Abstract).

* cited by examiner

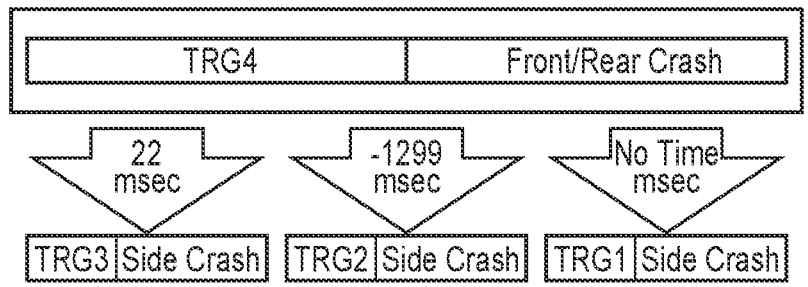
F I G. 7
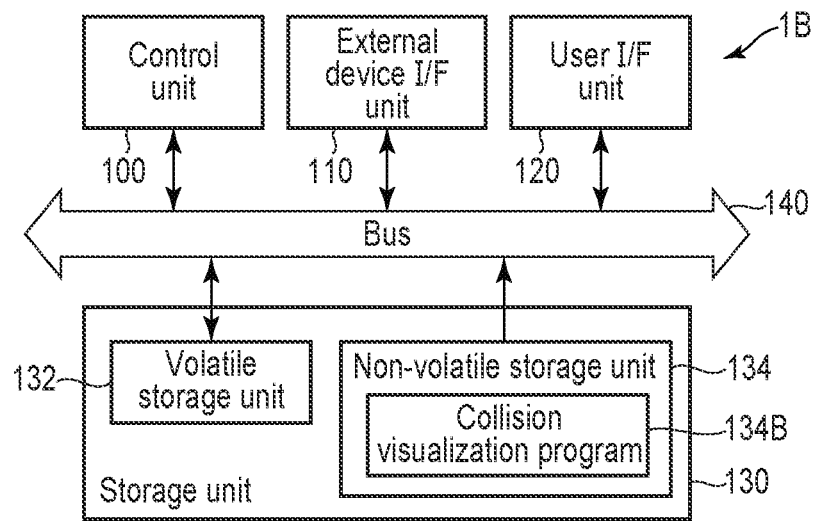
F I G. 8
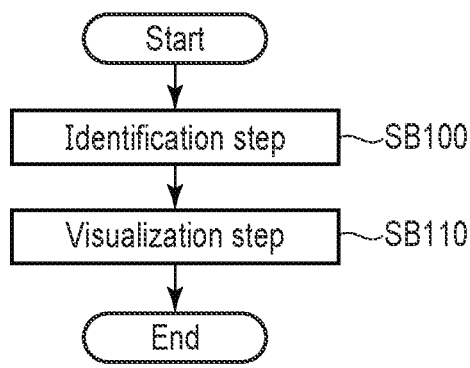
F I G. 9

| Time | Engine RPM | Motor RPM | Vehicle Speed | Accelerator Pedal | Service Brake | Service Brake Oil Pressure | Steering Input (degrees) | Yaw Rate (deg/sec) | Distance To TRG |
|---|---|---|---|---|---|---|---|---|---|
| 0 TRG | 900RPM | 3,700RPM | 49km/h | 0% | ON | 12.14Mpa | -0 | -5.414 | 0m |
| -0.45sec | 1,100RPM | 4,800RPM | 63km/h | 0% | ON | 12.14Mpa | -6 | -5.855 | 7m |
| -0.95sec | 1,000RPM | 6,000RPM | 80km/h | 0% | ON | 3.84Mpa | 3 | -4.635 | 16.93m |
| -1.45sec | 900RPM | 6,100RPM | 81km/h | 0% | ON | 0.14Mpa | 3 | -4.88 | 28.11m |
| -1.95sec | 1,000RPM | 6,300RPM | 84km/h | 0% | OFF | 0Mpa | -12 | -4.39 | 39.57m |
| -2.45sec | 900RPM | 6,400RPM | 85km/h | 17% | OFF | 0Mpa | -3 | -3.17 | 51.31m |
| -2.95sec | 1,000RPM | 6,400RPM | 85km/h | 20% | OFF | 0Mpa | -3 | -2.44 | 63.11m |
| -3.45sec | 1,000RPM | 6,400RPM | 86km/h | 21% | OFF | 0Mpa | -3 | -2.44 | 74.99m |
| -3.95sec | 1,000RPM | 6,500RPM | 86km/h | 23% | OFF | 0Mpa | -3 | -0.98 | 86.93m |
| -4.45sec | 1,200RPM | 6,500RPM | 86km/h | 30% | OFF | 0Mpa | 0 | -0.49 | 98.88m |
| -4.98sec | 1,300RPM | 6,500RPM | 86km/h | 31% | OFF | 0Mpa | 0 | -0.245 | 110.8m |

F I G. 21

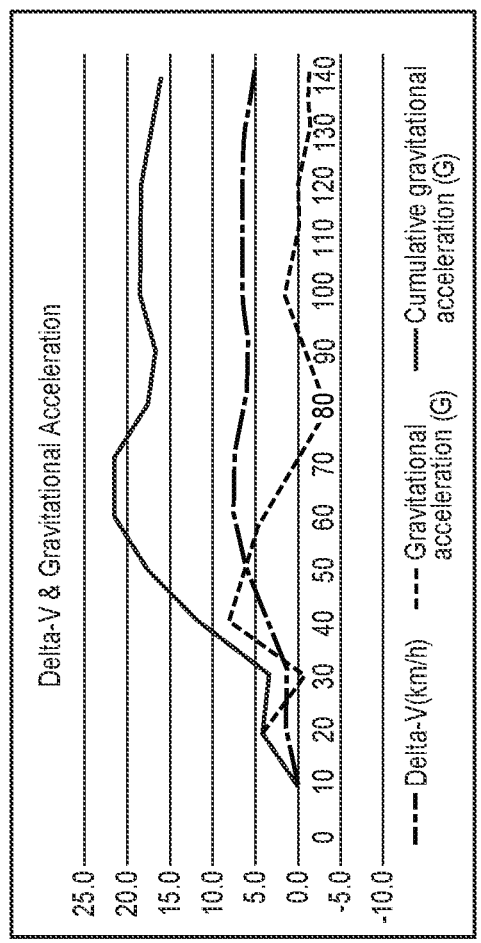
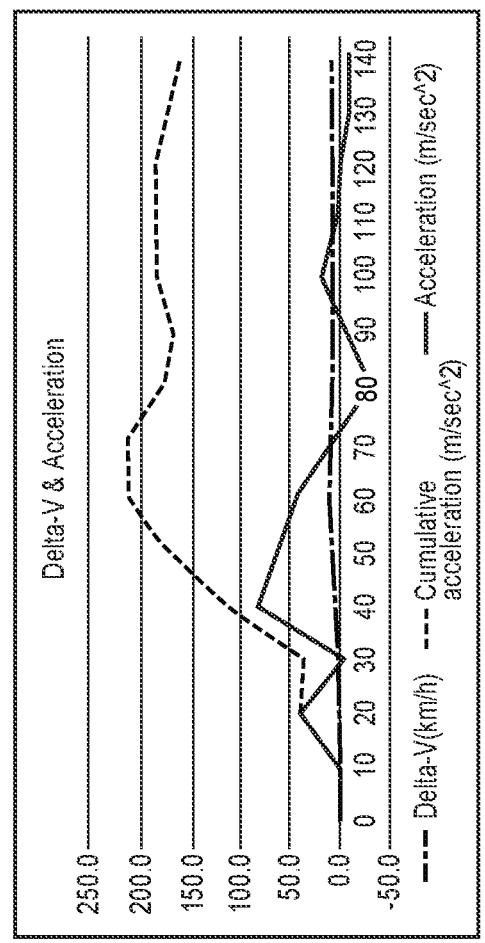
F I G. 25

COLLISION VISUALIZATION DEVICE FOR VISUALIZING DRIVING STATE OF VEHICLE AND RECORDING MEDIUM

CROSS-REFERENCE TO RELATED APPLICATIONS

This application is a continuation application of U.S. Ser. No. 17/032,574, filed Sep. 25, 2020, which is a Continuation Application of PCT Application No. PCT/JP2018/012820, filed Mar. 28, 2018, the entire contents of which are incorporated herein by reference.

BACKGROUND OF THE INVENTION

1. Field of the Invention

The present invention relates to a technique for visualizing a driving state of a vehicle when an event such as a collision occurs.

2. Description of the Related Art

In recent years, it is generally practiced to construct a traveling information analysis system (for example, see JP 2017-010191 A and JP 2017-005649 A) for the purpose of promoting safe driving for occupants of a vehicle and preventing an accident. This type of traveling information analysis system includes: a vehicle-mounted device (for example, an event data recorder) that collects and records traveling information indicating a traveling state of a vehicle such as an engine speed and a traveling speed at regular intervals while the vehicle is traveling; and an analysis device that analyzes the traveling information collected and recorded by the vehicle-mounted device. In addition, it has also been proposed to use a drive recorder that records an image captured by a vehicle-mounted camera as the vehicle-mounted device such that a state of the vehicle before and after occurrence of a collision (a driving state of the vehicle, a positional relationship with a counterpart vehicle in the collision, and the like) can be verified afterwards when the collision with the counterpart vehicle occurs.

BRIEF SUMMARY OF THE INVENTION

It is expected that the state of the vehicle when the collision occurs can be grasped more accurately as there are more types of the traveling information collected by the vehicle-mounted device. However, it becomes more difficult to grasp the state of the vehicle at the time of the collision at a glance as the number of types of the traveling information collected by the vehicle-mounted device increases.

The present invention has been made in view of the above-described problems, and an object thereof is to provide a technique that enables a state of a vehicle at the time of a collision to be grasped at a glance after the collision occurs.

To solve the above problem, it is provided a collision visualization device according to a present invention including: an identification unit configured to analyze vehicle traveling information (vehicle moving information, vehicle driving information, or vehicle running information) in which information representing at least a type and occurrence time of a collision or each of a series of collisions is recorded in accordance with occurrence order of each collision, and identify a state of a vehicle for each collision; and a visualization unit configured to cause a display device to display an iconic image representing the state of the vehicle, identified by the identification unit.

According to this aspect, the state of the vehicle at the occurrence time of each collision can be grasped at a glance by the iconic image displayed on the display device. Note that, as a different aspect of the present invention, it may be provided a non-transitory computer readable recording medium which stores a program causing a computer to function as: an identification unit configured to analyze vehicle traveling information in which information representing at least a type and occurrence time of a collision or each of a series of collisions is recorded in accordance with occurrence order of each collision, and identify a state of a vehicle for each collision; and a visualization unit configured to cause a display device to display an iconic image representing the state of the vehicle, identified by the identification unit. According to this aspect as well, the state of the vehicle at the occurrence time of each collision can be grasped at a glance.

In a more preferable aspect, when the series of the collisions are occurred, the identification unit identifies occurrence order of each the collisions, and the visualization unit causes the display device to display an iconic image reflecting occurrence order of each of the collisions identified by the identification unit.

According to this aspect, it is possible to grasp at a glance the occurrence order of a series of multiple collisions by an image displayed by the display device. Further, the visualization unit may cause the display device to display an iconic image designating a steering angle and a tilt of the vehicle.

Further, to solve the above problem, it is provided a collision visualization device comprising: an identification unit configured to analyze vehicle traveling information in which information representing at least a type and occurrence time of each collision generated in a vehicle to be analyzed in a time period including occurrence time of a collision or each of a series of collisions occurring for the vehicle, is recorded in accordance with occurrence order of each collision, and identify a first temporal change of a traveling speed of the vehicle and/or a counterpart vehicle in the collision in the time period, and/or a second temporal change of an impact applied to the vehicle; and a visualization unit configured to cause a display device to display a first iconic image representing the first temporal change identified by the identification unit and/or a second iconic image representing the second temporal change identified by the identification unit.

According to this aspect, it is possible to grasp at a glance the occurrence order of a series of multiple collisions by an image displayed by the display device. Note that, as a different aspect of the present invention, it may be provided a non-transitory computer readable recording medium which stores a program causing a computer to function as: an identification unit configured to analyze vehicle traveling information in which information representing at least a type and occurrence time of each collision generated in a vehicle to be analyzed in a time period including occurrence time of a collision or each of a series of collisions occurring for the vehicle, is recorded in accordance with occurrence order of each collision, and identify a first temporal change of a traveling speed of the vehicle and/or a counterpart vehicle in the collision in the time period, and/or a second temporal change of an impact applied to the vehicle; and a visualization unit configured to cause a display device to display a first iconic image representing the first temporal change identified by the identification unit and/or a second iconic image representing the second temporal change identified by the identification unit.

In addition, as a concrete providing aspect of each program, an aspect of writing and distributing each above program in a computer-readable recording medium such as a CD-ROM, or an aspect of distributing by downloading via a telecommunication line such as the internet is possible.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 7 is a view illustrating an example of the screen displayed by the control unit 100 on the display device.

FIG. 8 is a diagram illustrating a configuration example of a collision visualization device 1B according to a second embodiment of the present invention.

FIG. 9 is a flowchart illustrating a flow of a collision visualization process executed by the control unit 100 of the collision visualization device 1B according to a collision visualization program 134B.

FIG. 21 is a view illustrating an example of the screen displayed by the control unit 100 on the display device.

FIG. 25 is a view illustrating an example of the screen displayed by the control unit 100 on the display device.

DETAILED DESCRIPTION OF THE INVENTION

Hereinafter, embodiments of the present invention will be described with reference to the drawings.

A: First Embodiment

Figure 1:
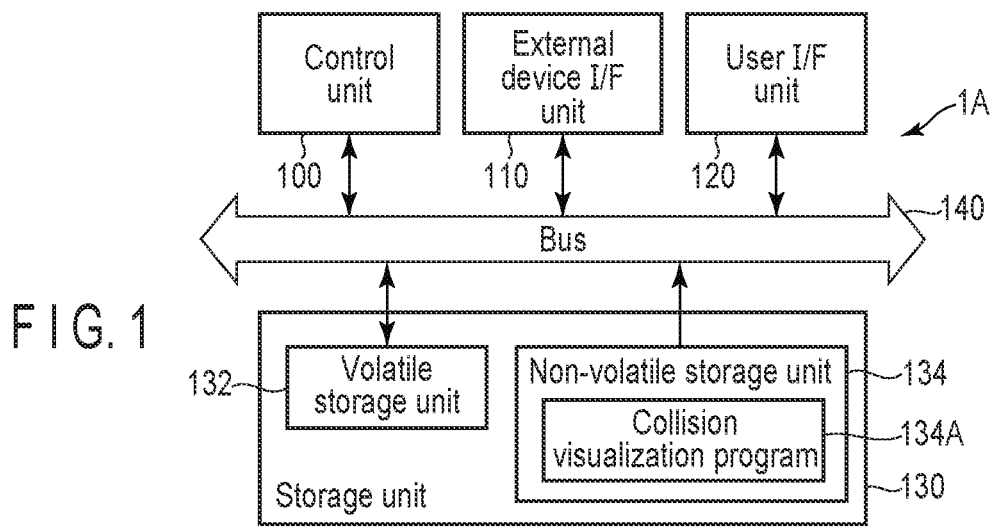
FIG. 1 is a diagram illustrating a configuration example of a collision visualization device 1A according to a first embodiment of the present invention.

FIG. 1 is a diagram illustrating a configuration example of a collision visualization device 1A according to a first embodiment of the present invention. As illustrated in FIG. 1, the collision visualization device 1A includes a control unit 100, an external device interface unit 110, a user interface unit 120, a storage unit 130, and a bus 140 that relays data transfer among these components. In FIG. 1, the external device interface unit is abbreviated as "external device I/F unit", and the user interface unit is abbreviated as "user I/F unit". Hereinafter, the same abbreviations are applied in the present specification.

The control unit 100 is, for example, a central processing unit (CPU). The control unit 100 operates according to a collision visualization program 134A stored in the storage unit 130 (more accurately, a non-volatile storage unit 134) to function as a control center of the collision visualization device 1A. Details of the processing executed by the control unit 100 according to the collision visualization program 134A will be clarified later to avoid duplication.

The external device I/F unit 110 is an aggregate of various interfaces such as a USB interface and a parallel interface for connection of external devices. In the present embodiment, vehicle traveling information collected by an event data recorder mounted on a vehicle in which a state at the time of a collision is analyzed by the collision visualization device 1A (hereinafter, the analysis target vehicle) is recorded in a hard disk connected to the event data recorder. As this hard disk is connected to the external device I/F unit 110, it is possible to input the vehicle traveling information of the analysis target vehicle to the collision visualization device 1A.

In the present embodiment, the vehicle traveling information input to the collision visualization device 1A includes at least event summary search information, longitudinal and lateral impact information, and pre-collision vehicle state information similarly to the vehicle traveling information collected and recorded by general event data recorders. All the event summary search information, the longitudinal and lateral impact information, and the pre-collision vehicle state information are files in the CSV format.

The event summary search information includes one or a plurality of records, and one record represents one event (collision). In the case of a simple accident in which a collision occurs only once, the event summary search information includes only one record corresponding to the collision. On the other hand, in the case of a complicated accident in which a plurality of collisions occur consecutively, the event summary search information includes records respectively corresponding to a series of the plurality of collisions, that is, a plurality of records.

In the records constituting the event summary search information, character strings or numerical values representing record configuration data are arranged to be delimited with a predetermined delimiter (specifically, a comma ","). Specific examples of the record configuration data include a character string representing a name of an event (for example, "most recent event", "first prior event", and the like), a trigger counter according to the end order of events, a collision type (a front/rear collision and a side collision), an event occurrence time starting from a predetermined reference point (zero time), a vehicle state identifier, and a collision content identifier. The zero time in the present embodiment is an occurrence time of an event that has ended the latest (generally, the event occurring most recently).

In the present embodiment, one page is allocated per event in the pre-collision vehicle state information. On each page, states of the vehicle before occurrence of the corresponding event (whether a seat belt is fastened, presence or absence and a size of a passenger on the front side, an operation state of a seat track position switch, an operation state of an airbag suppression switch, an operation state of an RSCA release button, a lighting state of an airbag warning lamp, and an ignition cycle, and the like) are described to be delimited with commas. For the vehicle state identifier in the pre-collision vehicle state information, a page number (a page number of the first page is 0) of a page representing the vehicle state before occurrence of an event corresponding to a record including the vehicle state identifier is set.

In the longitudinal impact information, one page is allocated per event representing a longitudinal collision. On each page, the duration of a speed change in a longitudinal direction (vehicle proceeding direction) caused by the corresponding event, a maximum value of the speed change in the longitudinal direction, and the time when the speed change in the longitudinal direction becomes the maximum are described to be delimited with commas. In the lateral impact information, similarly, one page is allocated per event representing a lateral collision. On each page, the duration of a speed change in a lateral direction (direction orthogonal to the proceeding direction and the vertical direction of the vehicle) caused by the corresponding event, a maximum value of the speed change in the lateral direction, and the time when the speed change in the lateral direction becomes the maximum are described to be delimited by commas. In the above-described collision content identifier, a page number (a page number of the first page is 0) of a page posting information on a speed change caused by an event corresponding to a record including the collision content identifier is set. For example, the page number of the corresponding page in the longitudinal impact information is set in the collision content identifier when the event type is a front/rear collision, and the page number of the corresponding page in the lateral impact information is set in the collision content identifier when the event type is a side collision.

The user I/F unit 120 includes a display device (not illustrated in FIG. 1) such as a liquid crystal display, and various input devices (not illustrated in FIG. 1) such as a mouse and a keyboard. A user of the collision visualization device 1A can input data and a command to the collision visualization device 1A by performing input operations such as dragging and dropping with the mouse and pressing of various keys. When the input operation is performed on the input device, the user I/F unit 120 delivers operation content data representing a content of the input operation to the control unit 100. As a result, an operation content of the user's input operation is transmitted to the control unit 100. Various images are displayed on the display device under the control of the control unit 100. Examples of the image displayed on the display device under the control of the control unit 100 include images of iconic images (a character string, a figure, a graph, or a combination thereof) representing a state of a collision that has occurred for the analysis target vehicle.

The storage unit 130 includes a volatile storage unit 132 and a non-volatile storage unit 134 as illustrated in FIG. 1. The volatile storage unit 132 is, for example, a random access memory (RAM). The volatile storage unit 132 is used by the control unit 100 as a work area at the time of executing various programs such as the above-described collision visualization program 134A. The non-volatile storage unit 134 is, for example, a hard disk. In the non-volatile storage unit 134, the collision visualization program 134A and a kernel program that causes the control unit 100 to realize an operating system (OS) are stored in advance.

When the power of the collision visualization device 1A (not illustrated in FIG. 1) is turned on, the control unit 100 reads the kernel program from the non-volatile storage unit 134 to the volatile storage unit 132 and starts the execution of the kernel program. The control unit 100 in the state of operating according to the kernel program and realizing the OS reads a program whose execution has been instructed by an operation of the input device of the user I/F unit 120 from the non-volatile storage unit 134 to the volatile storage unit 132, and starts the execution of the read program. For example, when the execution of the collision visualization program 134A is instructed by the operation of the input device of the user I/F unit 120, the control unit 100 reads the collision visualization program 134A from the non-volatile storage unit 134 to the volatile storage unit 132 and starts the execution of the read program. The control unit 100 operating according to the collision visualization program 134A executes a collision visualization process illustrated in FIG. 2 with input of the vehicle traveling information via the external device I/F unit 110 as a trigger.

Figure 2:
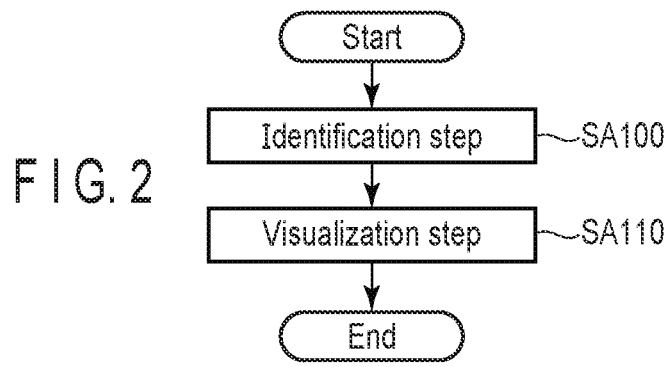
FIG. 2 is a flowchart illustrating a flow of a collision visualization process executed by a control unit 100 of the collision visualization device 1A according to a collision visualization program 134A.

As illustrated in FIG. 2, the collision visualization process includes two steps of an identification step SA100 and a visualization step SA110. In the identification step SA100, the control unit 100 analyzes vehicle traveling information input via the external device I/F unit 110, and identifies a state of an analysis target vehicle when an event occurs. More specifically, in the identification step SA100 of FIG. 2, the control unit 100 identifies whether the event has occurred only once or a plurality of times based on the number of records included in event summary search information. The control unit 100 refers to a page indicated by a vehicle state identifier and a page indicated by a collision content identifier included in the record to identify a state of the vehicle before the occurrence of the event corresponding to the record and a speed change caused by the event.

In the visualization step SA110 subsequent to the identification step SA100, the control unit 100 causes the display device of the user I/F unit 120 to display an iconic image representing the state of the vehicle identified in the identification step SA100. More specifically, as illustrated in FIG. 3, the control unit 100 displays the state of the vehicle identified in the identification step SA100 using an iconic image formed of an axis TA, a rectangle TB, and character strings X1 to X9.

The axis TA extends, for example, in the vertical scanning direction, and represents the above-described zero time. The rectangle TB is arranged with a left end of the rectangle TB separated from the axis TA by the amount corresponding to an occurrence timing of an event corresponding to the rectangle TB. Further, a length of the rectangle TB in a direction orthogonal to the axis TA is determined depending on the duration of a speed change caused by the event. In the character string X9, a character string representing the time from the zero time to the occurrence of the event corresponding to the rectangle TB is arranged. If there is only one event, or if it is an event that has ended most recently among the plurality of events, the control unit 100 displays the rectangle TB corresponding to this event with the left end of the rectangle TB overlapping the axis TA, and further sets NULL (or blank) in the character string X9.

Figure 3:
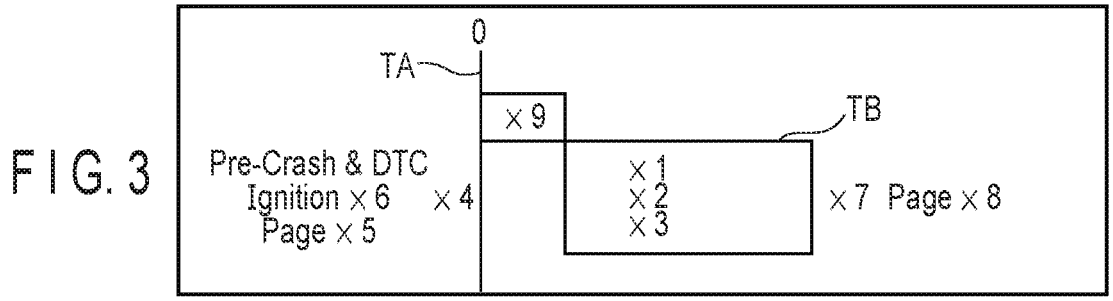
FIG. 3 is a view illustrating an example of a format of a screen displayed on a display unit by the control unit 100 in a visualization step SA110 of the collision visualization process.

Various types of information indicating the state of the vehicle identified in the identification step SA100 are set in the respective character strings X1 to X8 in FIG. 3. Specifically, a character string representing a name of an event is set in the character string X1, a character string representing a type of the event is set in the character string X2, a character string representing the duration of a speed change is set in the character string X3, and a trigger counter is set in the character string X4. Further, a page number indicating a corresponding page in the pre-collision vehicle state information is set in the character string X5, and an ignition cycle that is representative of information posted on the corresponding page is set in the character string X6. In the character string X7, "Front/Rear" is set when an event that has occurred is a front/rear collision, and "Side" is set when the event is a side collision. In the character string X8, a page number of a page representing details of the speed change caused by the corresponding event in the longitudinal or lateral impact information is set.

For example, it is assumed that event summary search information includes only one record indicating a front/rear collision, and information indicating that a speed change caused by a collision has occurred over 120 milliseconds is posted on a corresponding page in a longitudinal impact information (the page with a page number=0 since there is only one event). Further, it is assumed that information that an ignition cycle before occurrence of the collision was 8675 is posted on a corresponding page in pre-collision vehicle state information (similarly, the page with a page number=0). In this case, the control unit 100 causes the display device to display an iconic image illustrated in FIG. 4. The user viewing this iconic image can grasp, at a glance, that the collision has occurred once, that the collision was the front/rear collision, that the speed change caused by the collision continued for 120 milliseconds, that it is preferable to refer to the page with the page number=0 in the longitudinal impact information for details of an impact applied to the vehicle due to the collision, that the ignition cycle was 8675 before occurrence of the collision, and that it is preferable to refer to the page with the page number=0 in the pre-collision vehicle state information for states of the vehicle other than the ignition cycle.

If the event summary search information includes a plurality of records, the control unit 100 displays an iconic image in which the rectangle TB and the character strings X1 to X9 are set per event on the display device. For example, when a side collision has occurred after a lapse of 15 milliseconds since the occurrence of a front/rear collision, the control unit 100 displays an iconic image illustrated in FIG. 5 on the display device. The user viewing the display example illustrated in FIG. 5 can grasp, at a glance, that the front/rear collision occurred earlier and then the side collision occurred 15 milliseconds later, the duration of a speed change caused by each collision, an ignition cycle before each collision, and the like. Note that a reason that a trigger counter for the side collision is younger than a trigger counter for the front/rear collision (the front/rear collision occurring earlier is set as the most recent event, and the side collision occurring 15 milliseconds later is set as the first prior event) is as follows. As described above, the trigger counters are assigned in the ascending order of the end time of the event. In the example illustrated in FIG. 5, since the side collision ends earlier, the trigger counter of the side collision is younger than the trigger counter of the front/rear collision occurring 15 milliseconds before the side collision. There is a possibility that the order of occurrence of the plurality of events is erroneously recognized only by referring to the trigger counter, but it is possible to prevent the erroneous recognition as described above since the iconic images corresponding to each of the plurality of events are arranged in the order of occurrence and displayed on the display device in the present embodiment.

Figure 4:
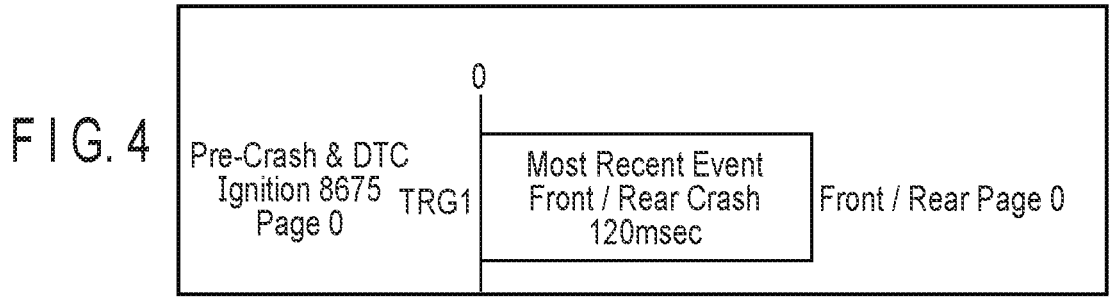
FIG. 4 is a view illustrating an example of the screen displayed by the control unit 100 on the display device.
Figure 5:
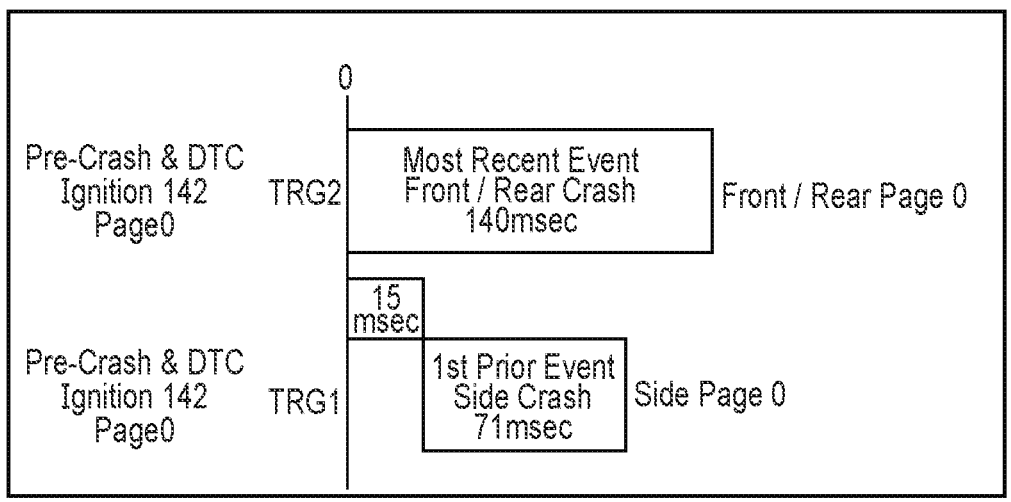
FIG. 5 is a view illustrating an example of the screen displayed by the control unit 100 on the display device.
Figure 6:
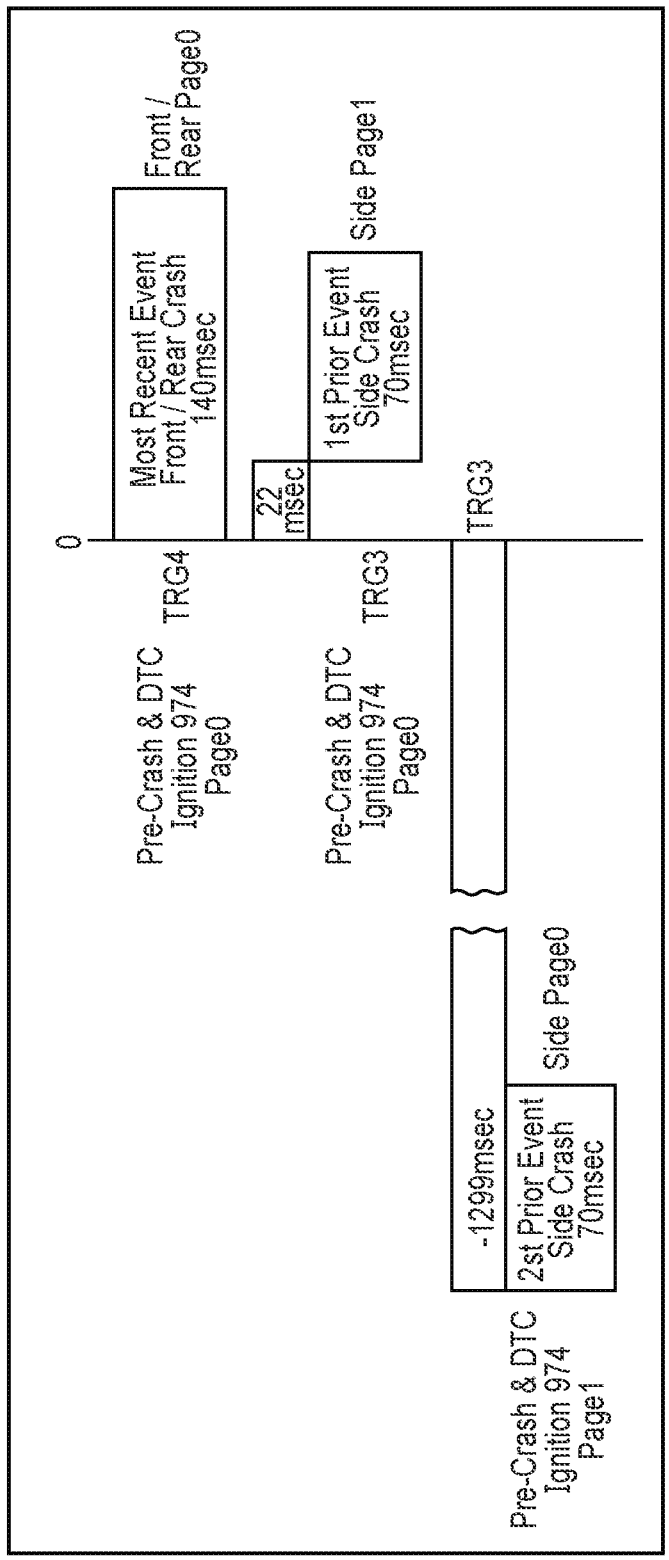
FIG. 6 is a view illustrating an example of the screen displayed by the control unit 100 on the display device.

In the case of a complicated accident where a plurality of events has occurred to overlap each other and pre-collision vehicle state information spans a plurality of pages, iconic images corresponding to the respective events overlap each other, and an event that is omitted and becomes invisible as in FIG. 6 may occur in the visualization illustrated in FIG. 4 or 5. In the example illustrated in FIG. 6, an event TRG1 with a trigger counter=1 and an event TRG4 with a trigger counter=4 occur to overlap each other, and thus, the Illustration of information on the event TRG1 is omitted. Therefore, an iconic image in which a time difference between a start time of an event ended most recently (that is, zero time) and a start time of another event is arranged for each event may be displayed on the display device as illustrated in FIG. 7, in addition to the respective iconic images illustrated in FIG. 4 or 5. In the example illustrated in FIG. 7, the event TRG1, which has occurred to overlap the event TRG4 and thus is omitted in FIG. 6, is illustrated.

As described above, according to the present embodiment, it is possible to grasp the state of the vehicle when a collision occurs at a glance, and it is possible to grasp the order of occurrence when a series of a plurality of collisions occur at a glance.

B: Second Embodiment

FIG. 8 is a diagram illustrating a configuration example of a collision visualization device 1B according to a second embodiment of the present invention. In FIG. 8, the same components as those in FIG. 1 are denoted by the same reference signs as those in FIG. 1. As apparent from the comparison between FIG. 8 and FIG. 1, a hardware configuration of the collision visualization device 1B is the same as the hardware configuration of the collision visualization device 1A. A difference between the collision visualization device 1B and the collision visualization device 1A is that a collision visualization program 134B is stored in the non-volatile storage unit 134 instead of the collision visualization program 134A. Hereinafter, the collision visualization program 134B, which is the difference from the first embodiment, will be mainly described.

FIG. 9 is a flowchart illustrating a flow of a collision visualization process executed by the control unit 100 according to a collision visualization program 14B. In FIG. 9, the same components as those in FIG. 2 are denoted by the same reference signs as those in FIG. 2. As apparent from the comparison between FIG. 9 and FIG. 2, the collision visualization process of the present embodiment differs from the collision visualization process of the first embodiment in terms of including a visualization step SB110 instead of the visualization step SA110. The visualization step SB110 is different in that a state of a vehicle is displayed using an iconic image illustrated in FIG. 10 instead of the iconic image illustrated in FIG. 3.

Figure 10:
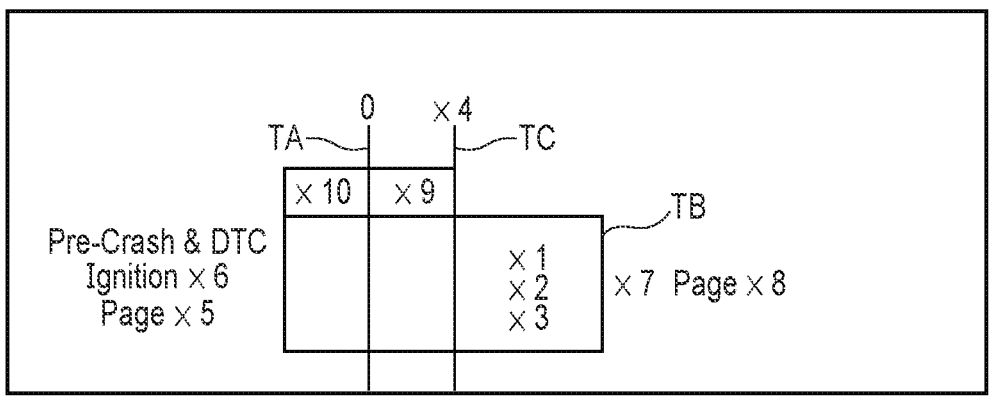
FIG. 10 is a view illustrating an example of a format of a screen displayed on a display device by the control unit 100 in a visualization step SB110 of the collision visualization process.

In FIG. 10, the same components as those in FIG. 2 are denoted by the same reference signs. As apparent from the comparison between FIG. 10 and FIG. 2, the iconic image illustrated in FIG. 10 is different in that there is an axis TC corresponding to an occurrence time of an event, that a rectangle TB is drawn with a left end of the rectangle TB at a start time of a speed change caused by the event, and that a character string X10 representing a time difference from the zero time to the start time of the speed change is drawn. If there is only one event, or if it is an event that has ended most recently among the plurality of events, the control unit 100 displays the axis TC to overlap the axis TA for the corresponding event, and further sets NULL (or blank) in the character string X9.

Figure 11:
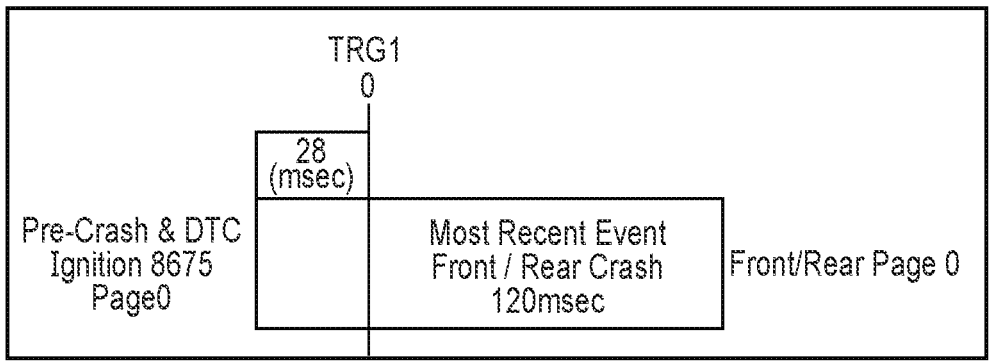
FIG. 11 is a view illustrating an example of the screen displayed by the control unit 100 on the display device.
Figure 12:
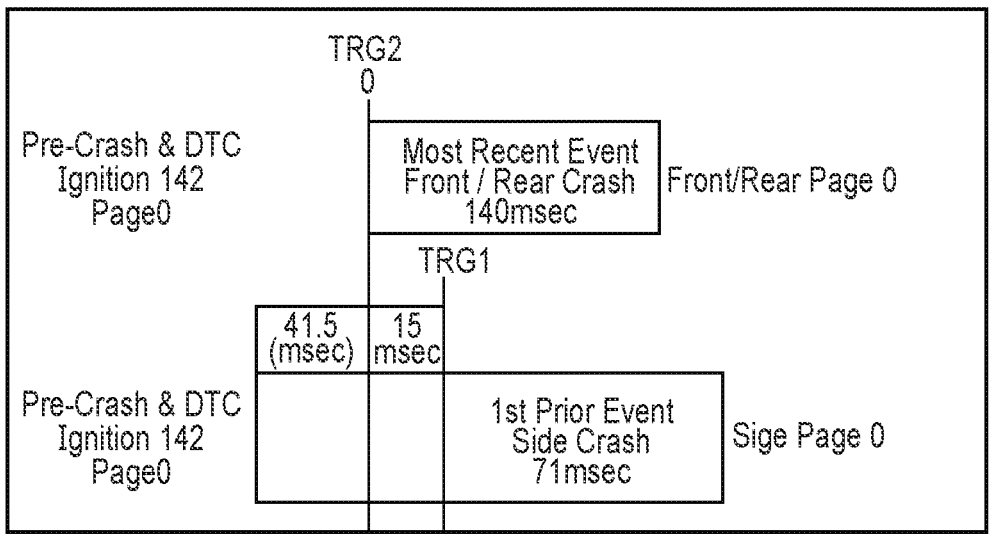
FIG. 12 is a view illustrating an example of the screen displayed by the control unit 100 on the display device.

For example, it is assumed that a speed change of the event TRG1 has started 28 milliseconds before the zero time in an accident in which the display illustrated in FIG. 4 is performed in the first embodiment. In this case, the control unit 100 causes the display device to display an iconic image illustrated in FIG. 11. Similarly, it is assumed that a speed change of the event TRG2 has started 45.1 milliseconds before the zero time in an accident in which the display illustrated in FIG. 5 is performed. In this case, the control unit 100 causes the display device to display an iconic image illustrated in FIG. 12.

Figure 13:
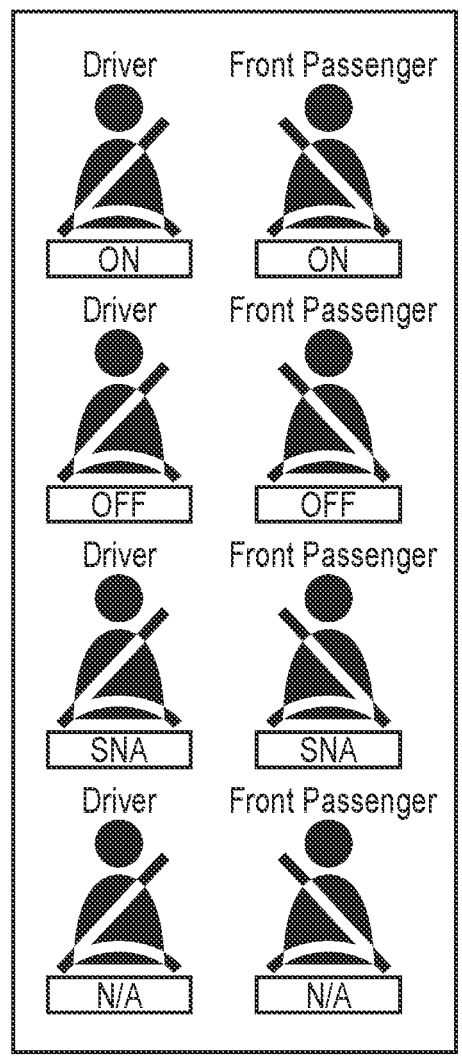
FIG. 13 is a view illustrating examples of icons displayed by the control unit 100 on the display device.
Figure 14:
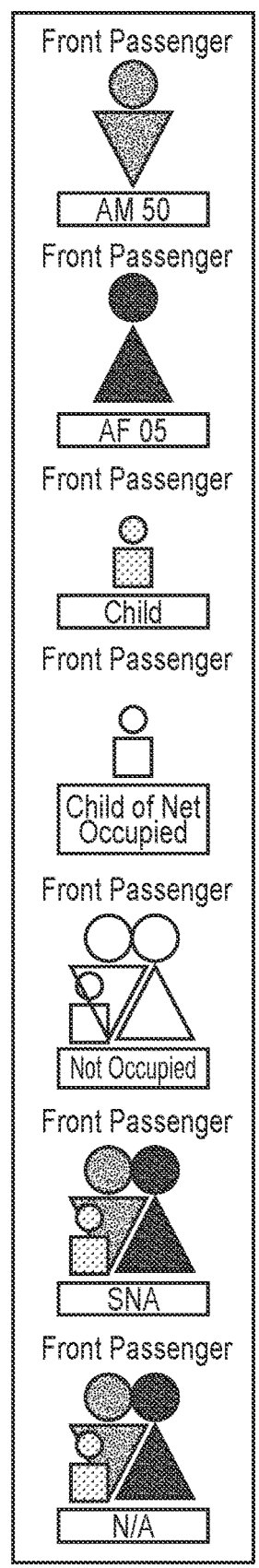
FIG. 14 is a view illustrating examples of the icons displayed by the control unit 100 on the display device.
Figure 15:
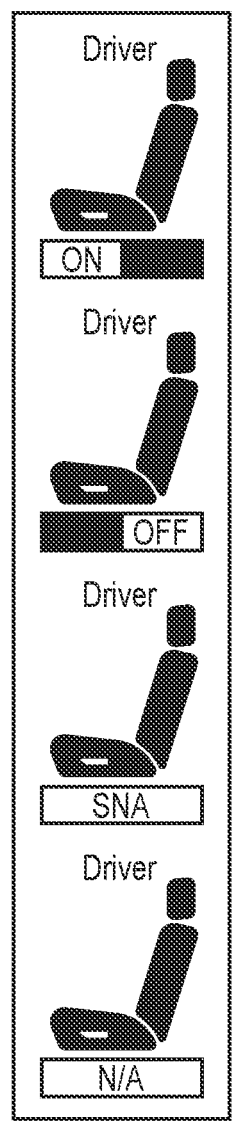
FIG. 15 is a view illustrating examples of the icons displayed by the control unit 100 on the display device.
Figure 16:
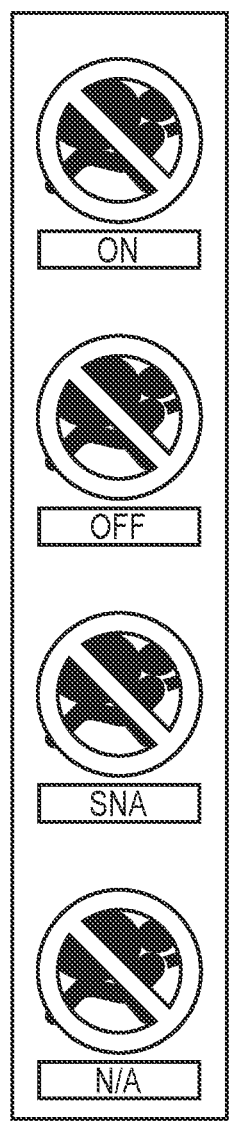
FIG. 16 is a view illustrating examples of the icons displayed by the control unit 100 on the display device.
Figure 17:
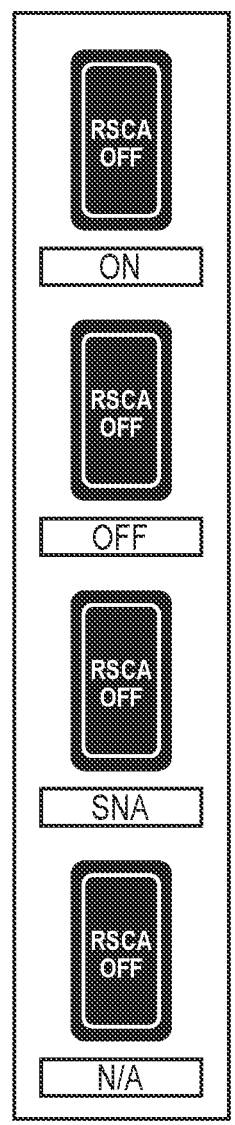
FIG. 17 is a view illustrating examples of the icons displayed by the control unit 100 on the display device.
Figure 18:
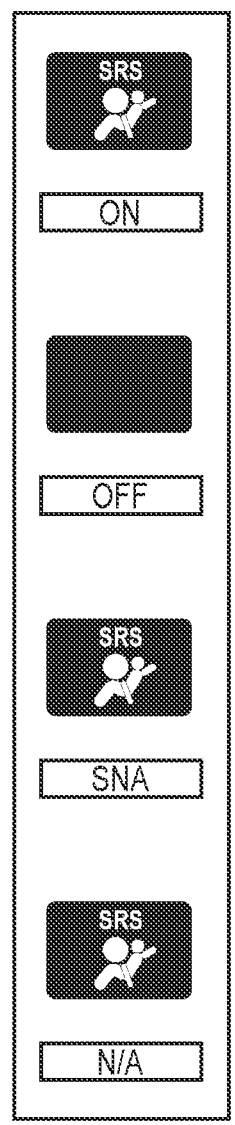
FIG. 18 is a view illustrating examples of the icons displayed by the control unit 100 on the display device.

Even in the present embodiment, it is possible to grasp the state of the vehicle when a collision occurs at a glance, and it is possible to grasp the order of occurrence when a series of a plurality of collisions occur at a glance. Note that the user may be allowed to grasp whether a seat belt is fastened, the presence or absence and a size of a passenger on the front side, an operation state of an RSCA release button, and a lighting state of an airbag warning lamp, and the like indicated by the data included in the pre-collision vehicle state information by displaying predetermined icons on the display device and visualizing the state of the vehicle at the time of the collision including these pieces of information. For example, whether the seat belt is fastened (ON, OFF, SNA, and N/A) may be visualized by displaying icons illustrated in FIG. 13. Similarly, the presence or absence and the size of the passenger on the front side may be visualized by displaying icons illustrated in FIG. 14, an operation state of a seat track position switch may be visualized by displaying icons illustrated in FIG. 15, an operation state of an airbag suppression switch may be visualized by displaying icons illustrated in FIG. 16, the operation state of the RSCA release button may be visualized by displaying icons illustrated in FIG. 17, and the lighting condition of the airbag warning lamp may be visualized by displaying icons illustrated in FIG. 18.

C: Third Embodiment

Figure 19:
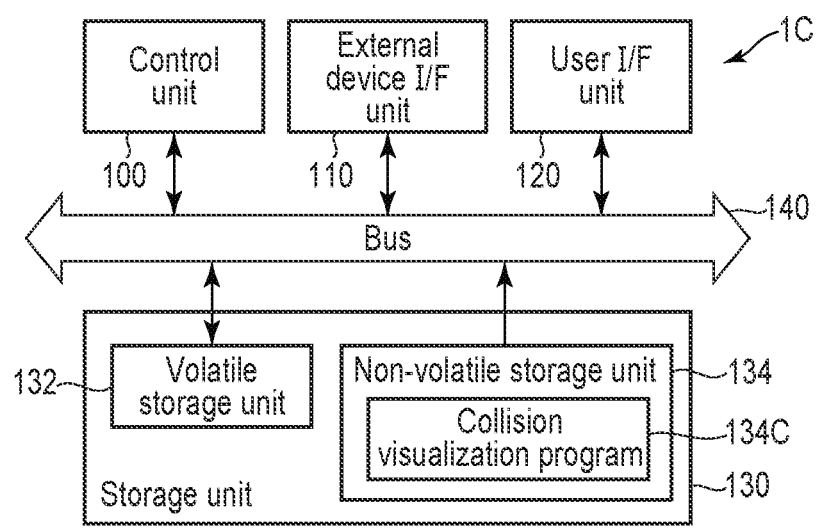
FIG. 19 is a diagram illustrating a configuration example of a collision visualization device 1C according to a third embodiment of the present invention.

FIG. 19 is a diagram illustrating a configuration example of a collision visualization device 1C according to a third embodiment of the present invention. In FIG. 19, the same components as those in FIG. 1 are denoted by the same reference signs. As apparent from the comparison between FIG. 19 and FIG. 1, a hardware configuration of the collision visualization device 1C is the same as the hardware configuration of the collision visualization device 1A. A difference between the collision visualization device 1C and the collision visualization device 1A is that a collision visualization program 134C is stored in the non-volatile storage unit 134 instead of the collision visualization program 134A. Hereinafter, the collision visualization program 134C, which is the difference from the first embodiment, will be mainly described.

Figure 20:
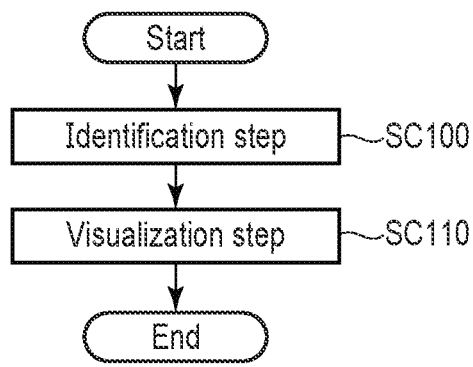
FIG. 20 is a flowchart illustrating a flow of a collision visualization process executed by the control unit 100 of the collision visualization device 1C according to a collision visualization program 134C.

FIG. 20 is a flowchart illustrating a flow of a collision visualization process according to the present embodiment. An identification step SC100 in the visualization process of the present embodiment is different from the identification step SA100 in terms that an engine speed at each recording timing between a recording start time and an event occurrence time (for example, recording timings at intervals of 1 millisecond), a motor speed, a vehicle speed, an accelerator pedal depression amount, an engine oil pressure, a steering angle, a tilt of a vehicle, and a moving distance of the vehicle are identified in addition to the contents identified in the identification step SA100 of the visualization process according to the first embodiment. The moving distance may be calculated by integrating moving distances calculated according to the following Formula (1) at each recording timing between the recording start time and the event occurrence time. The acceleration in Formula (1) is calculated according to the following Formula (2). Further, the tilt of the vehicle may be calculated by integrating values up to the recording timing, the value obtained by multiplying a time interval of a recording timing by a yow rate (deg/sec) depending on a steering angle at each recording timing up to the recording timing.

$$\text{Moving distance} = \text{Initial speed} + \tfrac{1}{2} \times \text{Acceleration} \times \text{Time}^2 \qquad (1)$$

$$\text{Acceleration} = (\text{Final speed} - \text{Initial speed})/\text{Time} \qquad (2)$$

In the identification step SC110 in the visualization process of the present embodiment, the control unit 100 tabulates the engine speed and the like identified in the identification step SC100 as illustrated in FIG. 21, and displays the resultant on the display device. If a plurality of events occur consecutively, the chart illustrated in FIG. 21 may be created and visualized for each event. According to the present embodiment, it is possible to grasp temporal changes of the steering angle and a direction of the vehicle when a collision occurs in detail at a glance.

D: Fourth Embodiment

Figure 22:
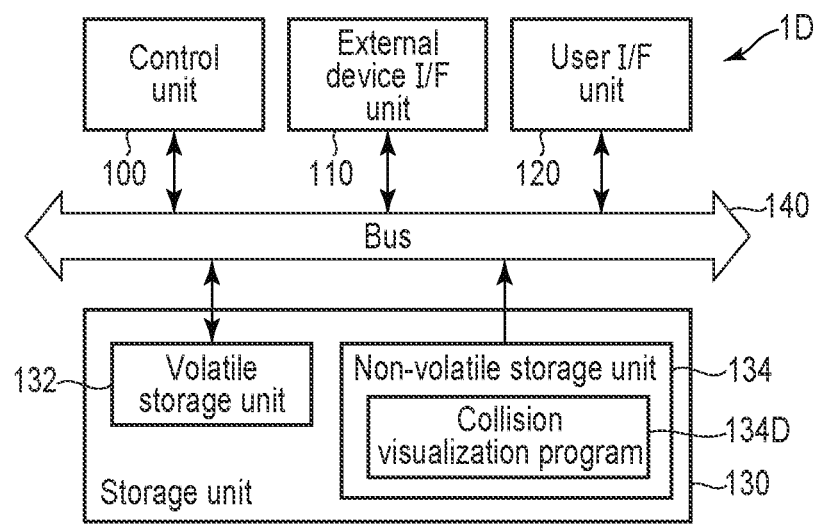
FIG. 22 is a diagram illustrating a configuration example of a collision visualization device 1D according to a fourth embodiment of the present invention.

FIG. 22 is a diagram illustrating a configuration example of a collision visualization device 1D according to a fourth embodiment of the present invention. In FIG. 22, the same components as those in FIG. 1 are denoted by the same reference signs. As apparent from the comparison between FIG. 22 and FIG. 1, a hardware configuration of the collision visualization device 1D is the same as the hardware configuration of the collision visualization device 1A. A difference between the collision visualization device 1D and the collision visualization device 1A is that a collision visualization program 134D is stored in the non-volatile storage unit 134 instead of the collision visualization program 134A. Hereinafter, the collision visualization program 134D, which is the difference from the first embodiment, will be mainly described.

Figure 23:
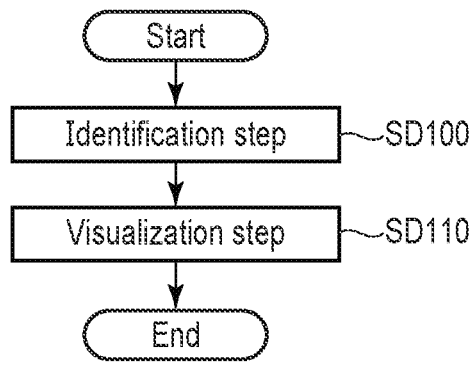
FIG. 23 is a flowchart illustrating a flow of a collision visualization process executed by the control unit 100 of the collision visualization device 1D according to a collision visualization program 134D.

FIG. 23 is a flowchart illustrating a flow of a collision visualization process according to the present embodiment. In an identification step SD100 in the visualization process of the present embodiment, a cumulative acceleration, a cumulative gravitational acceleration, an instantaneous acceleration, and an instantaneous gravitational acceleration in the longitudinal direction are identified (calculated) according to the following Formulas (3) to (6) based on a speed change ΔV at each recording time between a recording start time to an event occurrence time, in addition to the contents identified in the identification step SA100 of the visualization process of the first embodiment. Further, the control unit 100 identifies (calculates) a speed change ΔV, a cumulative acceleration, a cumulative gravitational acceleration, and an instantaneous gravitational acceleration in the lateral direction according to the following Formulas (7) to (10) based on an acceleration (instantaneous acceleration) at each recording time between the recording start time and the event occurrence time.

Instantaneous acceleration in longitudinal
    direction=ΔV/3.6/Recording time interval     (3)

Instantaneous gravitational acceleration in longitudinal direction=Acceleration in Formula (3)/9.81     (4)

Cumulative acceleration in longitudinal direction
    ΔV/3.6/Elapsed time from recording start     (5)

Cumulative gravitational acceleration in longitudinal
    direction=Cumulative acceleration in Formula
    (5)/9.81     (6)

Instantaneous gravity acceleration in lateral
    direction=Acceleration/9.81     (7)

Cumulative acceleration in lateral direction=Integral
    of acceleration from recording start to corresponding recording time     (8)

Cumulative gravitational acceleration in lateral
    direction=Cumulative acceleration in Formula
    (8)/9.81     (9)

ΔV in lateral direction=Acceleration×3.6×Time interval of recording time     (10)

Figure 24:
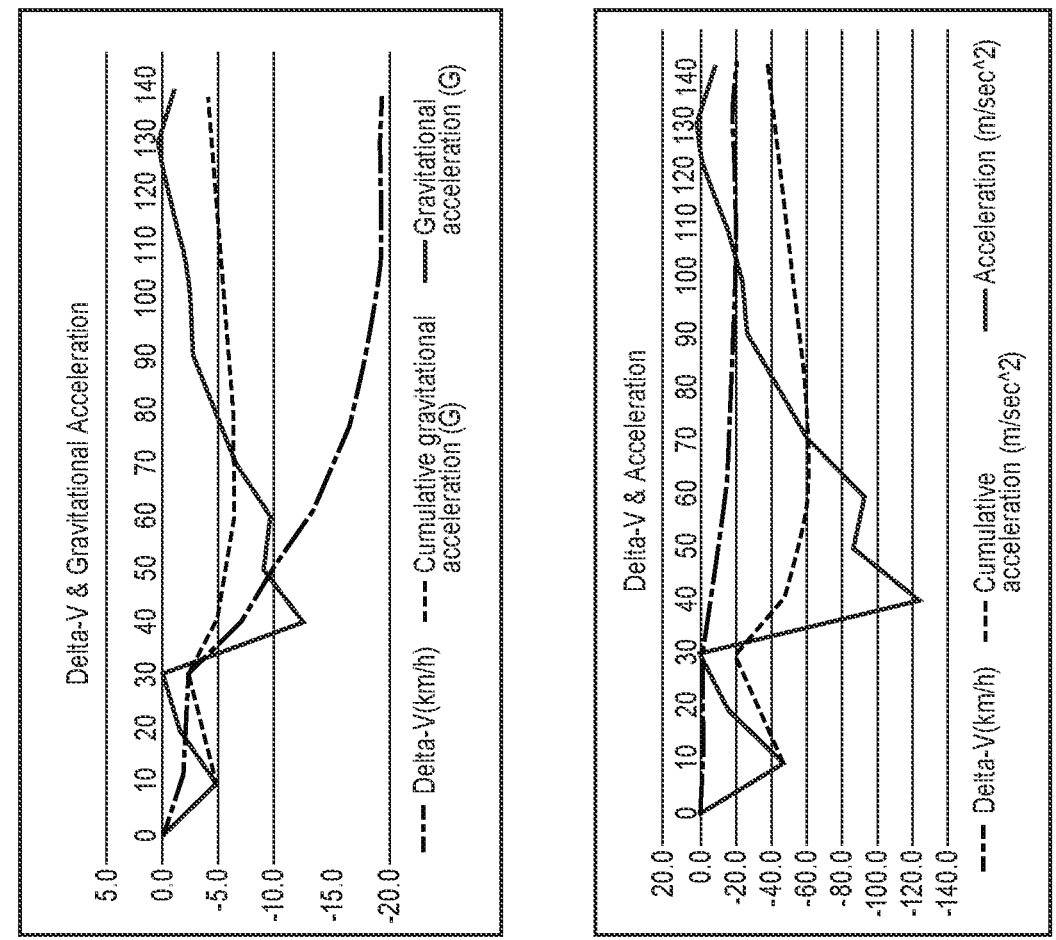
FIG. 24 is a view illustrating an example of the screen displayed by the control unit 100 on the display device.

In a visualization step SD110, the control unit 100 plots Δ-V, the cumulative gravitational acceleration, and the instantaneous gravitational acceleration on the same graph for each of the lateral and longitudinal directions (see FIGS. 24 and 25) and causes the display device to display the graph. With the display on the same graph, it is possible for a user to intuitively understand the relationship between the strength of an impact and time, and the relationship between the impact and the speed change. Even in the present embodiment, it is possible to grasp a state of the vehicle when a collision occurs at a glance.

Figure 26:
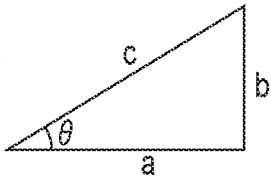
FIG. 26 is a view for describing a method of calculating an angle of an impact applied to a vehicle due to a collision.
Figure 27:
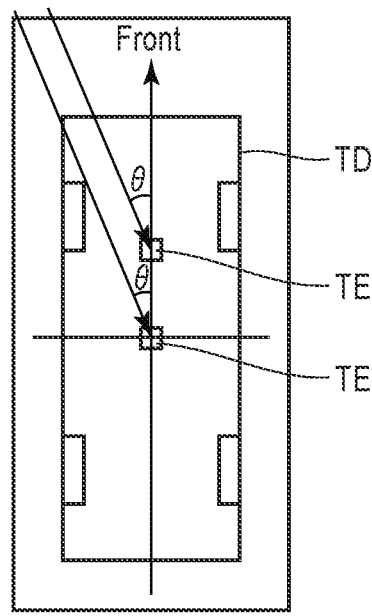
FIG. 27 is a view illustrating an example of the screen displayed by the control unit 100 on the display device.

Further, in the identification step SD100, a maximum value of the longitudinal speed change ΔV and a maximum value of the lateral speed change ΔV calculated according to Formula (10) may be applied as a height b and a base a of a right triangle illustrated in FIG. 26 to identify (calculate) an angle θ indicating a direction in which an impact is applied to an event data recorder. In the visualization step SD110, an iconic image in which a mounting position of a general event data recorder is drawn with a rectangle TE on a figure TD representing a size of a general vehicle may be used to display the angle θ identified in the identification step SD100 as illustrated in FIG. 27.

Further, a speed of a counterpart vehicle in a collision (hereinafter, a collision speed) may be calculated by inputting a weight of the counterpart vehicle, and the calculated collision speed may be displayed. Specifically, a weight of an analysis target vehicle, the weight of the counterpart vehicle, the longitudinal speed change ΔV, and a restitution coefficient are used to calculate a relative speed (hereinafter, an approach speed) of the counterpart vehicle according to the following Formula (11). Note that a suitable value may be set in advance regarding the restitution coefficient by appropriately performing an experiment or the like. In the case of a rear collision, a value obtained by adding the vehicle speed at the zero time to the approach speed calculated according to Formula (11) may be set as the collision speed. In the case of a front collision, the approach speed calculated according to Formula (11) may be used as the collision speed.

Approaching speed=ΔV×(weight of analyzed
    vehicle+weight of counterpart vehicle)/{weight
    of counterpart vehicle×(1+restitution coefficient)}     (11)

E: Modifications

Although the first to fourth embodiments of the present invention have been described above, the following modifications may of course be added to these embodiments.

(1) Although the CSV file recorded by the event data recorder mounted in the analysis target vehicle is input to each of the collision visualization devices 1A to 1D via a recording medium such as a USB memory in each of the above embodiments, the CSV file may be input to each of the collision visualization devices 1A to 1D by wireless communication using WI-FI or the like or wired communication via a LAN cable or the like.

(2) In each of the above embodiments, the display device, which is a display destination of the iconic image representing the traveling state of the vehicle before occurrence of the collision, is included in the user I/F unit 120 of each of the collision visualization devices 1A to 1D. However, the above-described iconic image may be displayed on a display device connected to the external device I/F unit 110 via a display cable or the like in the visualization step in FIG. 2, 9, 20, or 23. In this mode, the display device can be omitted from the user I/F unit 120. That is, the display device, which is the display destination of the iconic image representing the traveling state of the vehicle before occurrence of the collision, is not an essential component of the collision visualization device of the present invention, and any external component accessible by the collision visualization device of the present invention may be used.

(3) In each of the above embodiments, the collision visualization program that causes the control unit 100 to execute the processing of the identification step in FIG. 2, 9, 20, or 23 and the processing of the visualization step in the same drawings is stored in advance in the non-volatile storage unit 134 of each of the collision visualization devices 1A to 1D. However, the collision visualization program may be distributed in the state of being written in a computer-readable recording medium such as a compact disk-read only memory (CD-ROM), or may also be distributed by being downloaded via a telecommunication line such as the Internet. As a general computer such as a personal computer is operated according to the collision visualization program distributed in this manner, it is possible to cause the computer to function as the collision visualization device of the present invention, that is, cause the existing computer to function as the collision visualization device of the present invention.

Figure 28:
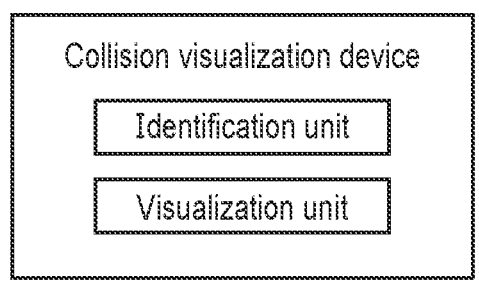
FIG. 28 is a view illustrating an example of the screen displayed by the control unit 100 on the display device.

(4) In each of the above embodiments, an identification unit that executes the identification step in FIG. 2, 9, 20, or 23 and a visualization unit that executes the visualization step in the same drawings are realized by a software module. However, each of the identification unit and the visualization unit may be configured using an electronic circuit, and the collision visualization device of the present invention may be configured by combining the identification unit and the visualization unit as illustrated in FIG. 28.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A collision visualization device comprising:
   a first unit configured to identify occurrence order of each of a series of collisions in a vehicle based on information representing a type and occurrence time of each of the collisions, and assign a trigger counter to each of the collisions in accordance with ascending order of end time of each of the collisions; and
   a second unit configured to cause a display device to display the type of each of the collisions, the trigger counter of each of the collisions, and an iconic image reflecting the occurrence order of each of the collisions identified by the first unit.

2. The collision visualization device of claim 1, wherein the second unit is configured to cause the display device to further display duration for each of the collisions.

3. The collision visualization device of claim 1, wherein the information is vehicle traveling information in which information representing the type and the occurrence time of each of the collisions is recorded in accordance with the occurrence order of each of the collisions.

4. The collision visualization device of claim 3, wherein the first unit is an identification unit configured to analyze the information, and identify a state of the vehicle for each of the collisions.

5. The collision visualization device of claim 4, wherein the second unit is a visualization unit configured to cause the display device to display a character string representing a name of each of the collisions, the type of each of the collisions, and duration for each of the collisions, the trigger counter of each of the collisions, and an iconic image representing the state of the vehicle for each of the collisions identified by the identification unit.

6. The collision visualization device of claim 1, wherein the second unit is configured to cause the display device to further display an iconic image in which time difference between start time of a collision ended most recently and start time of another collision is arranged for each of the collisions.

7. The collision visualization device of claim 1, wherein the second unit is configured to cause the display device to further display an iconic image designating a steering angle and a tilt of the vehicle.

8. A non-transitory computer readable recording medium which stores a program causing a computer to function as:
   a first unit configured to identify occurrence order of each of a series of collisions in a vehicle based on information representing a type and occurrence time of each of the collisions, and assign a trigger counter to each of the collisions in accordance with ascending order of end time of each of the collisions; and
   a second unit configured to cause a display device to display the type of each of the collisions, the trigger counter of each of the collisions, and an iconic image reflecting the occurrence order of each of the collisions identified by the first unit.

9. The non-transitory computer readable recording medium of claim 8, wherein the second unit is configured to cause the display device to further display duration for each of the collisions.

10. The non-transitory computer readable recording medium of claim 8, wherein the information is vehicle traveling information in which information representing the type and the occurrence time of each of the collisions is recorded in accordance with the occurrence order of each of the collisions.

11. The non-transitory computer readable recording medium of claim 10, wherein the first unit is an identification unit configured to analyze the information, and identify a state of the vehicle for each of the collisions.

12. The non-transitory computer readable recording medium of claim 11, wherein the second unit is a visualization unit configured to cause the display device to display a character string representing a name of each of the collisions, the type of each of the collisions, and duration for each of the collisions, the trigger counter of each of the collisions, and an iconic image representing the state of the vehicle for each of the collisions identified by the identification unit.

13. The non-transitory computer readable recording medium of claim 8, wherein
   the second unit is configured to cause the display device to further display an iconic image in which time difference between start time of a collision ended most recently and start time of another collision is arranged for each of the collisions.

14. The non-transitory computer readable recording medium of claim 8, wherein
   the second unit is configured to cause the display device to further display an iconic image designating a steering angle and a tilt of the vehicle.

* * * * *